Dec. 26, 1967  W. H. KORTE  3,360,641
SUBSTAGE ILLUMINATING DEVICE FOR MICROSCOPES
Filed Oct. 4, 1965  2 Sheets-Sheet 1
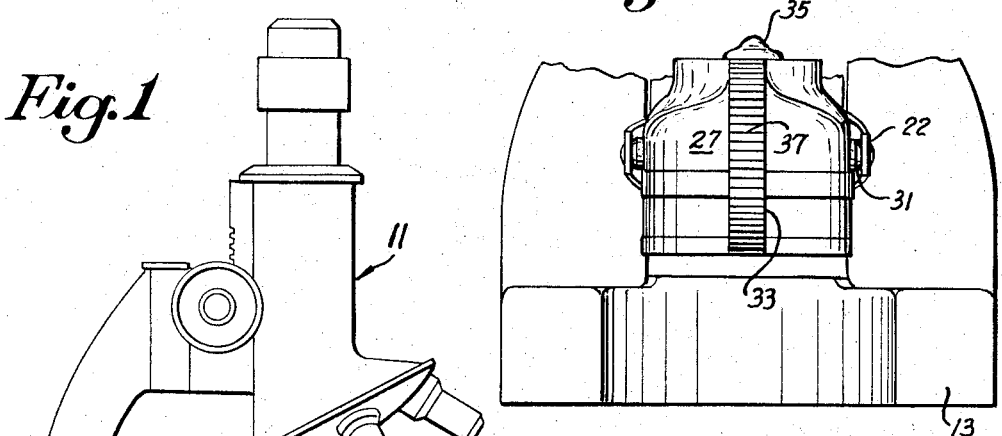
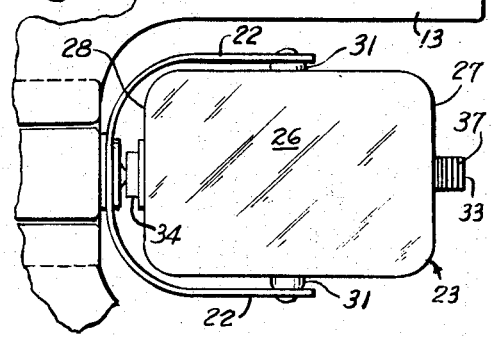
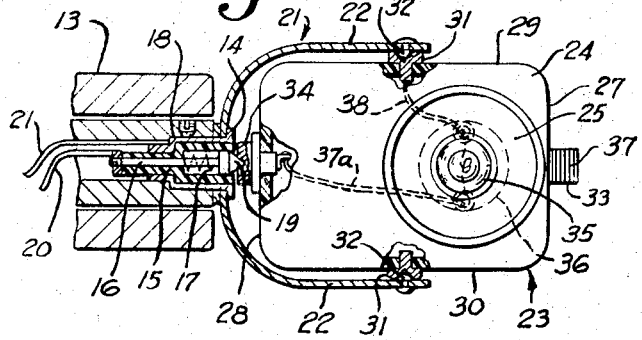
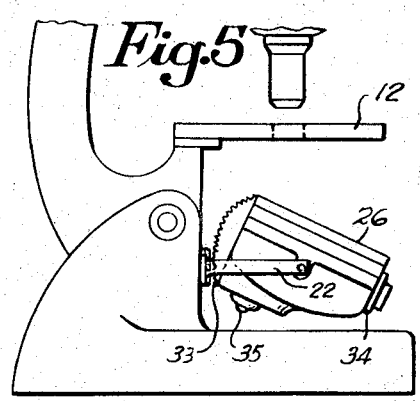
INVENTOR.
WILLARD H. KORTE
BY
ATTORNEY Dec. 26, 1967   W. H. KORTE   3,360,641
SUBSTAGE ILLUMINATING DEVICE FOR MICROSCOPES
Filed Oct. 4, 1965   2 Sheets-Sheet 2
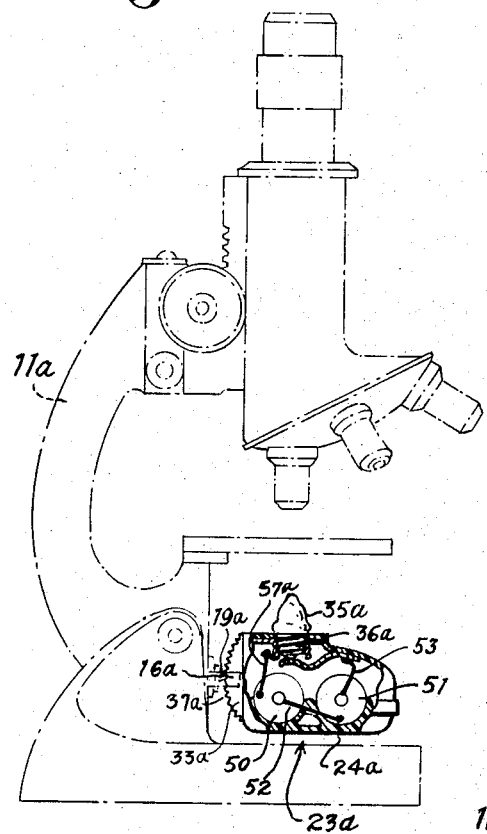
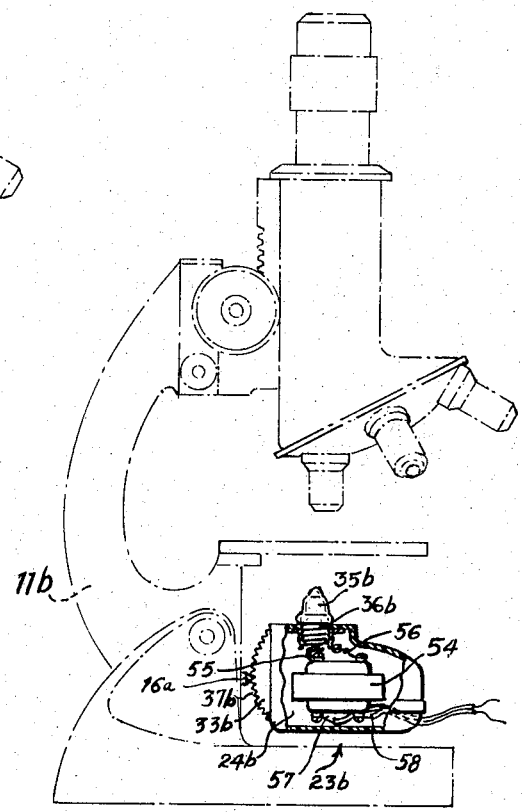
INVENTOR.
WILLARD H. KORTE
BY
ATTORNEY

United States Patent Office

3,360,641
Patented Dec. 26, 1967

3,360,641
SUBSTAGE ILLUMINATING DEVICE FOR
MICROSCOPES
Willard H. Korte, North Miami Beach, Fla., assignor to
Tasco Sales, Inc., Miami, Fla., a corporation of
Florida
Filed Oct. 4, 1965, Ser. No. 492,762
10 Claims. (Cl. 240—2)

ABSTRACT OF THE DISCLOSURE

A microscope substage illuminating device having a casing pivotally supported beneath the stage of a microscope. The casing carries a bulb member and a ratchet positioning member. An outwardly biased but inwardly movable probe abuts the ratchet. Power means are provided to power the bulb.

---

This invention relates to a substage illuminating device for a microscope or the like. The device is so designed that substage illumination can be produced by means of an intensely focused light beam directly upon the area to be examined or can be produced by conventional mirror illumination. If mirror illumination is used, positioning means are provided so that the mirror can be properly positioned with respect to a source of external light. Thus the device serves a dual function, allowing the operator of the device to utilize either prefocused internal artificial light or mirror reflected external light.

In normal biological applications microscopy requires the utilization of these two distinct types of light sources of substage illumination of specimens depending upon the application desired.

Prior devices have been awkward, expensive, clumsy, and have not suited the purpose.

The above constitutes a brief description of the instant invention and the objects and advantages thereof.

The invention will now be further described by reference to the accompanying drawings which are made a part of this specification.

FIG. 1 is a side view of a microscope to which is connected the device of this invention. In the position shown in this figure the artificial illuminating means are engaged and focus directly upon the stage of the microscope.

FIG. 2 is a sectional view of the structure shown in FIG. 1 taken along lines 2—2 of FIG. 1.

FIG. 3 is a front detailed view of a portion of the structure shown in FIG. 1 on an enlarged scale.

FIG. 4 is a plan view of a portion of the structure shown in FIG. 1 with the artificial illuminating means in engaged position and focused upon the microscope stage.

FIG. 5 is a fragmentary side view of the structure shown in FIG. 1, showing the mirror positioned with respect to the external source of light and focusing said light source upon the microscope stage. The invention will now be further described by reference to a detailed description of the structure set forth specifically in the drawings. However, the reader is cautioned to note that the specific structure set forth herein is for illustrative purposes and for purposes of example only. Various changes and modifications could obviously be made within the spirit and scope of this invention and would occur to those skilled in this art.

FIG. 6 is a detail side view, partly in section, of an alternative form of the substage illuminating device of this invention utilizing battery power for illumination. The microscope to which the device of this invention is attached is shown in phantom lines.

FIG. 7 is a detail side view similar to that of FIG. 6 but showing still another alternative form of the substage illuminating device of this invention utilizing a self-contained transformer and insulated power cord.

Referring to the drawings in detail and to the form of invention shown in FIGS. 1–5, a microscope 11 is formed with the stage 12 having the conventional opening (not shown) thereupon. The microscope includes a base 13 to which a first electrical contacting member 14 is secured. Member 14 is formed with a hollow housing 15 within which a probe 16 is disposed. A spring 17 surrounds probe 16 and is disposed within enlarged cavity 18 provided within housing 15. Probe 16 terminates in a pointed end portion 19 and is normally urged outwardly by spring 17.

A first conductor 20 is electrically connected to probe 16.

A second electrical contacting member 21 is formed with a pair of spaced laterally extending arms 22. A second conductor 24 causes member 21 to be in electrical contact with a power source.

Substage illuminating device 23 is formed with a casing 24 having a front face 25, a rear face 26, a top face 27 and a bottom face 28. A pair of oppositely disposed faces 29 and 30 are also provided. Each of said faces 29 and 30 bear a receptacle 31 and a complementary ball 32 secured to each of arms 22 is disposed within each receptacle 31. As a result, device 23 is pivotally movable about member 21.

Top face 27 bears a projecting ratchet 33 having teeth 37 thereupon. Bottom face 28 bears an electrical contacting member 34 thereupon. Front face 25 bears a bulb 35 thereupon which is disposed within a socket 36. A conductor 37a extends from one prong of socket 36 in electrical contact with member 34 and a second conductor 38 extends between the opposite prong of socket 36 and an element 31.

Now referring to the alternative form of the invention shown in FIG. 6 the microscope 11a is similar in form to the microscope 11. A housing is provided similar to housing 15 in construction but has no electrical means connected thereto. Probe 16a is disposed within a housing similar to housing 15 and is surounded by a spring similar to spring 17. Probe 16a terminates in a pointed end portion 19a and is normally urged outwardly by the spring.

Illuminating device 23a is formed with a casing 24a having top, bottom, front, and rear faces similar to faces 27, 28, 25 and 26. The receptacle and ball construction including elements similar to 31 and 32 on faces 29 and 30 and arms 22 are also provided as in the principal form of this invention but, again, no electrical means are connected thereto.

The top face of casing 24a bears a projecting ratchet 33a having teeth 37a thereupon. The front face of the casing bears a bulb 35a thereupon which is disposed within a socket 36a. A first conductor 57a extends from one prong of socket 36a and is in electrical contact with the negative pole of battery 50 which is disposed within casing 24a. A second battery 51 is also provided within casing 24a. Batteries 50 and 51 are conventional 1.5 volt dry cells.

A second conductor 52 extends between the positive pole of battery 50 to the negative pole of battery 51 and a third conductor 53 extends between the positive pole of battery 51 and the opposite prong of socket 36a. A switch (not shown) may be optionally employed in series with the electrical circuit to turn the device on and off.

Now referring to the second alternative form of the invention shown in FIG. 7 the microscope 11b is again similar in form to microscope 11. A housing is again provided therewithin similar to housing 15 in construction but again has no electrical means connected thereto. Probe 16b is disposed within a housing similar to housing 15 and is surrounded by a spring similar to spring 17. Probe 16b terminates in a pointed end portion 19b and is normally urged outwardly by the spring.

Illuminating device 23b is formed with a casing 24b having top, bottom, front and rear faces similar to faces 27, 28, 25 and 26. The receptacle and ball construction including elements similar to 31 and 32 on faces 29 and 30 and arms 22 are also provided as in the principal form of this invention but, again, no electrical means are connected thereto.

The top face of casing 24b bears a projecting ratchet 33b having teeth 37b thereupon. The front face of the casing bears a bulb 35b thereupon which is disposed within a socket 36b. A transformer 54 (preferably a stepdown transformer from 110 volts to 9 volts) is disposed within casing 24b. A conductor 55 extends from an output pole of transformer 54 to a pole of socket 36b and a conductor 56 extends between the opposite output pole of transformer 54 to the opposite pole of socket 36b. A conductor 57 extends from a power source (not shown) to an input pole of transformer 54 and a conductor 58 also extends from the power source to the opposite input pole of transformer 54. A switch (not shown) may be optionally provided in series with the electrical circuit to turn the device on and off.

With the foregoing specific description of this invention the operation of the principal form thereof can now be explained.

When it is desired to utilize prefocused internal lighting beneath the stage 12 of microscope 11, device 23 is pivotally moved until point 19 contacts member 34. At this point there is electrical contact between conductors 20 and 21 and bulb 35 so that bulb 35 illuminates. Illumination of bulb 35 will only be accomplished when elements 19 and 34 are in contact so that the illumination occurs at a prefocused point.

When mirror illumination is desired, element 23 is rotated until the teeth 37 contact point 19. The device will then be positioned at various points, depending upon the angle of reflection desired by the operator with respect to the external source of light being used, thus controlling both the intensity and direction of light falling upon the stage 12 of microscope 11. At this point, since teeth 37 are insulated, there is no electrical contact involved.

Now referring to the operation of the first alternative form of this invention as set forth in FIG. 6 the bulb 35a is lighted by being connected to the batteries 50 and 51. The bulb is positioned by the position of portion 19a of probe 16a within two adjacent teeth 37a of ratchet 33a. If casing 24a is turned the force is sufficient to force portion 19a inwardly against the tension of spring 17 and permit portion 19a to pass over teeth 37a. However once the torque is removed from casing 24a portion 19a will snap forwardly between any two adjacent teeth 37a and be positioned in any other selected position.

The operation of the second alternative form of this invention set forth in FIG. 7 is similar to the form shown in FIG. 6. However, in this case, power is applied to bulb 35b through connection of transformer 54 to a power source.

The foregoing sets forth the manner in which the operation of this invention is achieved.

I claim:

1. In a microscope having a body, lenses movably connected to said body and a stage projecting from said body beneath said lenses, the improvement that comprises a substage illuminating device pivotally connected to said body beneath said stage, said substage illuminating device comprising a casing having a pair of oppositely disposed first faces, a second face intervening said first faces, a pair of laterally disposed third faces intervening said first faces and offset from said second face, illuminating means projecting from a first face, mirror means upon an opposite first face, and positioning means upon the second face.

2. A microscope substage illuminating device comprising a casing having a pair of oppositely disposed first faces, a second face intervening said first faces, a pair of laterally disposed third faces intervening said first faces and offset from said second face, pivot means upon each of said third faces, illuminating means projecting from a first face, mirror means upon an opposite first face, and ratchet positioning means upon the second face.

3. A microscope substage illuminating device comprising a pivotally movable casing having a front face, a rear face, a top face, a bottom face, and a pair of oppositely disposed side faces, electrically actuated illuminating means projecting from said front face, a mirror upon said rear face, a ratchet member upon said top face, an electrical contact member upon said bottom face, and pivot means upon each of said side faces.

4. In combination with a microscope having an outwardly biased first electrical contacting member and a second electrical contacting member having a pair of spaced laterally extending arms, the improvement that comprises a substage illuminating device having a front face, a rear face, a top face, a bottom face, and a pair of oppositely disposed side faces, an electrically actuated bulb projecting from said front face, a pair of conductors connected to said bulb, a mirror upon said rear face, an insulated ratchet member projecting from said top face adapted to selectively abut said first electrical contacting member, a third electrical contacting member connected to one of said pair of conductors projecting from said bottom face and also adapted to selectively abut and make electrical contact with said first electrical contacting member of said microscope, a pair of spaced pivot members adapted to abut said laterally extending arms, the other member of said pair of conductors maintaining electrical contact with said second electrical contacting member, so that electrical contact is made at only one point to illuminate said bulb when said third electrical contacting member is in contact with the said first electrical contacting member and wherein said substage illuminating device may be selectively positioned at various points when said mirror is in operative relationship, so as to properly focus external light means.

5. A microscope having a body, a bifurcated holder disposed upon said body, an illuminating device comprising a casing, supporting means upon said casing abutting said holder, illuminating means projecting from said casing, battery means within said casing powering said illuminating means, ratchet positioning means projecting from said casing, and a movable probe carried by said body abutting said ratchet.

6. A microscope having a body, a bifurcated holder disposed upon said body, an illuminating device comprising a casing, supporting means abutting said holder, a socket within said casing, a bulb within said socket, a stepdown transformer connected to said bulb, ratchet positioning means projecting from said casing, and a movable probe carried by said body abutting said ratchet.

7. A microscope substage illuminating device comprising a casing having a pair of oppositely disposed first faces, a second face intervening said first faces, a pair of laterally disposed third faces intervening said first faces and offset from said second face, pivot means upon each of said third faces, a socket within said casing, a bulb within said socket and projecting from a first face, electrical power means within said casing, ratchet positioning means upon said second face, and a movable probe member abutting said ratchet positioning means.

8. A microscope substage illuminating device as described in claim 7 wherein the electrical power means comprise a pair of 1.5 volt dry batteries in series with one another.

9. A microscope substage illuminating device as described in claim 7 wherein the electrical power means comprise a step-down transformer producing approximately 9 volts of electrical power at its output terminals.

10. A microscope substage illuminating device as described in claim 7 wherein said ratchet has a plurality of spaced teeth, and said probe member is outwardly biased but inwardly movable and is normally disposed between a pair of adjacent teeth.

References Cited
UNITED STATES PATENTS

| | | |
|---|---|---|
| 2,448,974 | 9/1948 | Guttmann. |
| 2,752,823 | 7/1956 | Martin et al. _____ 240—4.2 |
| 2,730,923 | 1/1956 | Gorham et al. _____ 240—2 X |
| 2,764,672 | 9/1956 | Koedderich et al. _ 240—10.65 X |
| 2,971,080 | 2/1961 | Boughton. |

NORTON ANSHER, *Primary Examiner.*